Aug. 11, 1931.   R. W. DINZL   1,818,387
STEAM PLATEN
Filed July 23, 1928
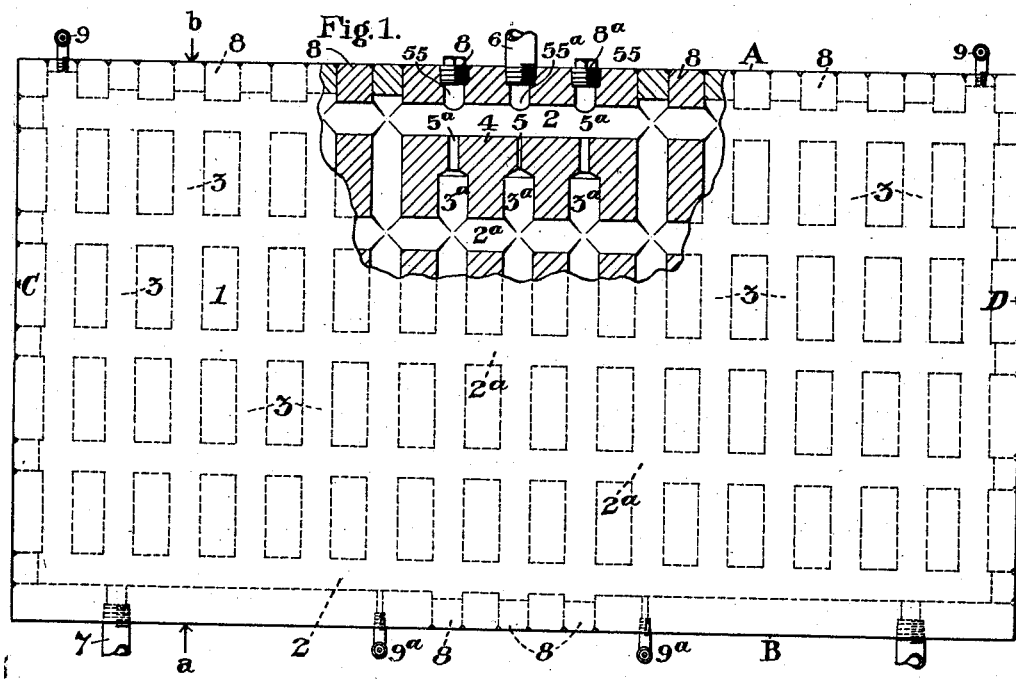
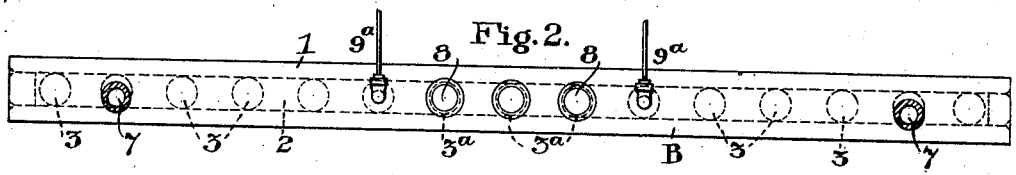
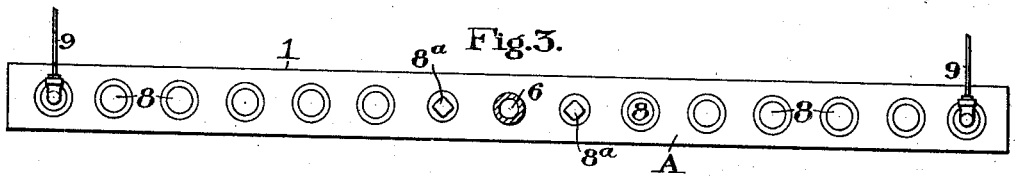
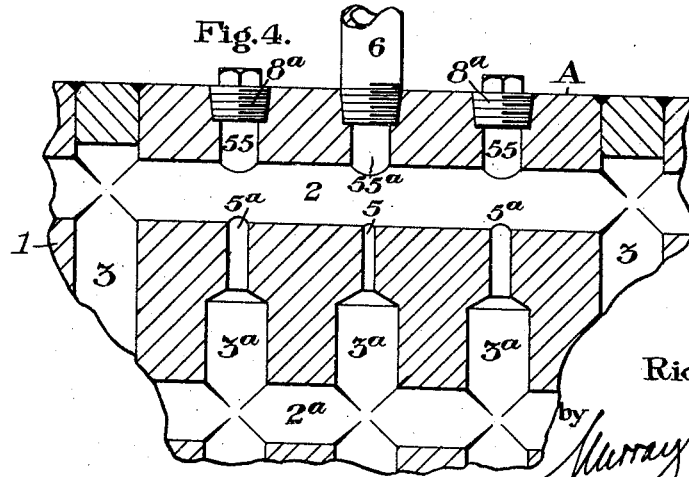
INVENTOR:
Richard W. Dinzl,
Atty.

Patented Aug. 11, 1931

1,818,387

UNITED STATES PATENT OFFICE

RICHARD W. DINZL, OF MARGATE CITY, NEW JERSEY, ASSIGNOR TO SOUTHWARK FOUNDRY & MACHINE COMPANY, OF PHILADELPHIA, PENNSYLVANIA, A CORPORATION OF PENNSYLVANIA

STEAM PLATEN

Application filed July 23, 1928. Serial No. 294,880.

My invention relates to steam plates or as they are called "platens", such as employed in the curing, vulcanizing, or other heat treatment of rubber and composition goods, synthetic resins, bakelite, etc., or for other purposes where a heated plate is required; such plates or platens having internal passages for the circulation of steam or other heating medium, and in some instances a cooling medium; in other words a "temperature-controlling" medium. For such purpose provision is made for the introduction and withdrawal of such temperature-controlling medium and in order that such temperature-controlling medium may be circulated continuously throughout the whole extent of the plate or platen, the passages therein are in communication with each other and provide a continuous conduit.

The present invention comprises a plate or platen having cross passages placed relatively close together and extending in both directions; said passages paralleling each other at right angles to marginal sides or edges of the plate, with passages adjacent such marginal sides or edges at right angles to the cross passages; certain of said cross passages being bored from one marginal edge or side of the plate and meeting the passage at right angles thereto adjacent the opposite marginal side or edge of the plate, and certain other passages being bored from the second mentioned marginal side or edge of the plate and stopping short of the passage paralleling said first mentioned marginal side or edge; the first mentioned sets or groups of cross passages flanking the group of second mentioned cross passages which are preferably centrally disposed and communicate with the passage extending along the marginal side or edge of the plate by through openings of graduated size formed in a baffle wall; the central opening being less in area than those on each side of the same, and the inlet for the introduction of the temperature controlling medium being opposite said central opening which is preferably disposed midway the ends of the plate.

In the present instance the central passages having the through openings of graduated size are three in number, although it will be understood that a greater or less number may be employed so long as the through openings are graduated in size from the central through opening to those flanking the same. In addition to the passages adjacent the marginal sides or edges of the plate or platen, other passages are employed paralleling the same so that the plate as a whole is made up of cross passages at right angles to each other forming an internal channel or conduit for the free circulation of the temperature-controlling medium. The outlets from this internal channel, which may be two in number, are disposed at the marginal side or edge of the plate opposite the inlet connection, and the ends of the several passages which are bored or drilled from all four sides of the plate or platen and not employed for inlet or discharge purposes, are closed by plugs which may be threaded into suitably prepared sockets but are preferably sweated or welded in said openings.

These and other features of my invention are more fully described hereinafter; reference being had to the accompanying drawings, in which:

Figure 1 is a plan view of a platen having an internal channel or conduit formed in accordance with my present invention.

Fig. 2 is an edge view looking in the direction of the arrow a, Fig. 1.

Fig. 3 is an edge view looking in the direction of the arrow b, Fig. 1.

Fig. 4 is an enlarged sectional view of a portion of the plate or platen shown in Fig. 1.

In the drawings, 1 represents the body of the plate or platen, which is preferably of rolled steel and of uniform thickness throughout its entire extent. This plate may be rectangular in contour and in the drawings, (and for illustrative purposes only), it is indicated as being slightly longer than wide; the marginal sides or edges indicated at A and B, being somewhat longer than the marginal sides or edges indicated at C and D. This shape, however, is not representative of all plates embodying my invention, and my invention is not limited to any dimensions of either width or length relatively to each other, as square plates, or plates having a relatively great length with respect to the dimension which may be termed the width, may have the features which constitute my present invention. For the purpose of description only, the marginal edges indicated at A and B may represent the "length" of the plate, and the marginal edges indicated at C and D may represent the "width" of the plate.

The plate may be drilled from end to end of the same lengthwise thereof, or between the marginal edges C and D, to form the passages 2 and $2^a$; the passages 2 being adjacent the marginal sides or edges A and B, and the passages $2^a$, intermediate the same. In addition, cross passages 3 and $3^a$ are drilled across the width of the plates; the passages 3 extending from one side only, in the present instance being grouped at the ends of the plate and extending inward from the marginal side or edge indicated at A.

Intermediate these passages 3, are a series of passages $3^a$ which are drilled from the marginal side or edge B of the plate, to a point a short distance from the longitudinal passage 2 adjacent the marginal side or edge A, leaving between the ends of said passages $3^a$ and said longitudinal passage 2, a wall 4, and said passages $3^a$ communicate with said longitudinal passage 2 by means of smaller through openings 5 and $5^a$ passing through said wall; the opening 5 being centrally disposed and being less in cross sectional area than the through openings $5^a$; said openings being so proportioned that while the central passage of the group indicated at $3^a$ may receive from the inlet pasage 6 sufficient temperature controlling medium by reason of its alignment with said inlet; the through openings $5^a$ will also be properly supplied. By reason of this partial baffling, and the further fact that the discharge outlets 7 which provide for circulation of the temperature controlling medium are set adjacent the ends of the plate or platen at the marginal side or edge B of the same; such temperature-controlling medium will pass to the several passages disposed at right angles to each other and forming the internal channel or conduit, and insure the proper heating of the entire plate or platen.

The ends of the several passages which pass through the marginal walls of the plate or platen are closed by plugs 8, which may be threaded into properly prepared sockets at the ends of the passages, although they are preferably sweated or welded therein. The through openings 5 and $5^a$ may be bored from the marginal side or edge A of the plate or platen, which is provided with the drilled openings 55 and $55^a$; the opening 55 receiving the inlet pipe 6 and the openings $55^a$ being closed by the threaded plugs $8^a$.

Certain of the plugs 8 on the side or edge A of the platen may be drilled for the attachment of thermometers 9, and the marginal side or edge B may be provided with small drilled openings for the attachment of thermometers $9^a$.

The several passages 2 and $2^a$, and 3 and $3^a$, are preferably of the same cross sectional area, although it will be understood that I do not wish to be limited to such construction, and that if a better distribution of the temperature controlling medium may be effected by the use of passages, either lengthwise of the plate or crosswise of the plate, that are larger or smaller, as the case may be, such arrangement is within the scope of my invention. In all instances, however, I provide the partial baffle wall indicated at 4, with the through openings connecting the central group of cross passages with the longitudinal passage adjacent the marginal side or edge of the plate, which are proportioned to each other; the central opening having the smaller cross sectional area of the group whether such group be made up of three or more cross passages; preferably an odd number.

I claim:

1. A heating platen comprising a thin-walled metal plate having passages extending in both directions through the body of the same substantially at right angles to each other; certain of said passages extending in one direction passing through both marginal edges of the plate, while the other cross passages are arranged in groups; the passages of one group extending from one marginal side or edge at right angles to the passages which pass through two marginal edges of the plate and the passages of the other group extending from the opposite marginal side or edge at right angles to the passages which pass through two marginal edges of the plate and said last-named cross passages being partially baffled by an apertured wall between the internal ends of the same and one of the passages which opens through two edges of the plate adjacent a marginal side or edge of the same, in combination with means including inlet and outlet connections for closing the open ends of said several passages.

2. A heating platen comprising a thin-walled rectangular metal plate having passages extending in both directions through the body of the same substantially at right angles to each other; the passages extending lengthwise of the plate passing through both marginal edges of the same, while the cross passages are arranged in groups; the passages of one group extending from one marginal side or edge to a longitudinal passage adjacent the opposite marginal edge of the plate and the passages of the other group extending from the last-named marginal side or edge; and said last-named group of passages being partially baffled by an apertured wall between the internal ends of the same and one of the longitudinal passages adjacent the opposite marginal side or edge of the plate, in combination with means including inlet and outlet connections for closing the open ends of said passages.

3. A heating platen comprising a thin-walled metal plate having passages extending in both directions through the body of the same substantially at right angles; certain of said passages extending in one direction passing through both marginal edges of the plate, while the other cross passages are arranged in groups; the passages of one group extending from one marginal side or edge at right angles to the passages which pass through two marginal edges of the plate and the passages of the other group extending from the opposite marginal side or edge at right angles to the passages which pass through two marginal edges of the plate, an apertured baffle wall between the internal ends of said last-named group of passages and one of the passages adjacent a marginal side or edge of the plate which opens through two edges of the plate, means for closing the open ends of a plurality of said passages, and inlet and outlet connections for certain of said passages.

4. A heating platen comprising a thin-walled rectangular metal plate having passages extending in both directions through the body of the same substantially at right angles; the passages extending longitudinally of the plate passing through both marginal edges of the same, while the cross passages are arranged in groups; the passages of one group extending from one marginal side or edge to a longitudinal passage adjacent the opposite marginal edge of the plate and the passages of the other group extending from the last-named marginal side or edge; an apertured baffle wall between the internal ends of said last-named group of passages and one of the longitudinal passages adjacent a marginal side or edge, means for closing the open ends of a plurality of said passages, and inlet and outlet connections for certain of said passages.

5. A heating platen comprising a thin-walled metal plate having a series of passages extending in one direction through the body of the same and opening through opposite marginal sides or edges of the plate, and groups of other passages at right angles to the first-named passages; a plurality of said groups of passages extending from one marginal edge to the passages adjacent the opposite marginal edge which extends at right angles to said passages through opposite marginal edges of the plate, and another group which extends from the opposite marginal edge and substantially centrally of the plate; said latter group terminating short of the passage at right angles thereto which extends through opposite marginal sides or edges of the plate adjacent the marginal side or edge of the plate opposite their point of entrance and being separated therefrom by a baffle wall having through openings which may be in axial alignment and are of materially less cross sectional area than the main passages, in combination with means including inlet and outlet connections for closing open ends of said passages.

6. A heating platen comprising a thin-walled metal plate having a series of passages extending in one direction through the body of the same and opening through opposite marginal sides or edges of the plate, and groups of other passages at right angles to the first-named passages; a plurality of said groups of passages extending from one marginal edge to the passage adjacent the opposite marginal edge which extends at right angles to said groups of passages through opposite marginal edges of the plate, and another group which extends from the opposite marginal side or edge and substantially centrally of the plate; said latter group terminating short of the passage at right angles thereto which extends through opposite marginal edges of the plate adjacent the marginal side or edge of the plate opposite their point of entrance, a baffle wall having through openings which may be in axial alignment with the passages of said last-named group and are of materially less cross sectional area than the main passages; said baffle wall separating said last mentioned group of passages from the passage at right angles thereto which extends through opposite edges of the plate, means for closing open ends of a plurality of said passages, and inlet and outlet connections for certain of said passages.

7. In a structure such as set forth in claim 1, arranging the inlet for temperature-controlling media centrally with respect to one marginal edge of the plate, and discharge outlets for said temperature-controlling media at the opposite marginal edge of the plate.

8. In a structure such as set forth in claim 1, arranging the inlet for temperature-controlling media centrally with respect to one marginal edge of the plate and opposite the central group of short passages, and arranging the discharge outlets for said temperature-controlling media at the opposite marginal edge of the plate.

9. In a structure such as set forth in claim 1, arranging the inlet for temperature-controlling media centrally with respect to one marginal edge of the plate and opposite said apertured baffle wall, and arranging the discharge outlets for said temperature-controlling media at the opposite marginal edge of the plate.

10. In a structure such as set forth in claim 1, arranging the inlet for temperature-controlling media centrally with respect to one marginal edge of the plate and opposite said apertured baffle wall communicating with the central group of short passages, and arranging the discharge outlets for said temperature-controlling media at the opposite marginal edge of the plate.

11. In a structure such as set forth in claim 1, arranging the inlet for temperature-controlling media centrally with respect to one marginal edge of the plate, and arranging the discharge outlets for said temperature-controlling media adjacent to the ends of the plate and opening through the edge of the wall opposite the wall in which said inlet opening is formed.

12. In a structure such as set forth in claim 1, arranging the inlet for temperature-controlling media centrally with respect to one marginal edge of the plate and opposite the central group of short passages, and arranging the discharge outlets for said temperature-controlling media adjacent to the ends of the plate and opening through the edge of the wall opposite the wall in which said inlet opening is formed.

13. In a structure such as set forth in claim 1, arranging the inlet for temperature-controlling media centrally with respect to one marginal edge of the plate and opposite said apertured baffle wall, and arranging discharge outlets for said temperature-controlling media adjacent to the ends of the plate and opening through the edge of the wall opposite the wall in which said inlet opening is formed.

14. In a structure such as set forth in claim 1, arranging the inlet for temperature-controlling media centrally with respect to one marginal edge of the plate and opposite said apertured baffle wall communicating with the central group of short passages, and arranging the discharge outlets for said temperature-controlling media adjacent to the ends of the plate and opening through the edge of the wall opposite the wall in which said inlet opening is formed.

15. In a structure such as set forth in claim 6, a baffle wall having through openings in axial alignment with the central group of short passages and of materially less cross sectional area than the main passages, with the central through opening of less diameter than the others; said baffle wall separating said group of short passages from a passage at right angles thereto adjacent to a marginal side or edge of the plate.

In witness whereof I have signed this specification.

RICHARD W. DINZL.